J. P. SMITH.
Corn Sheller.
No. 102,607. Patented May 3, 1870.
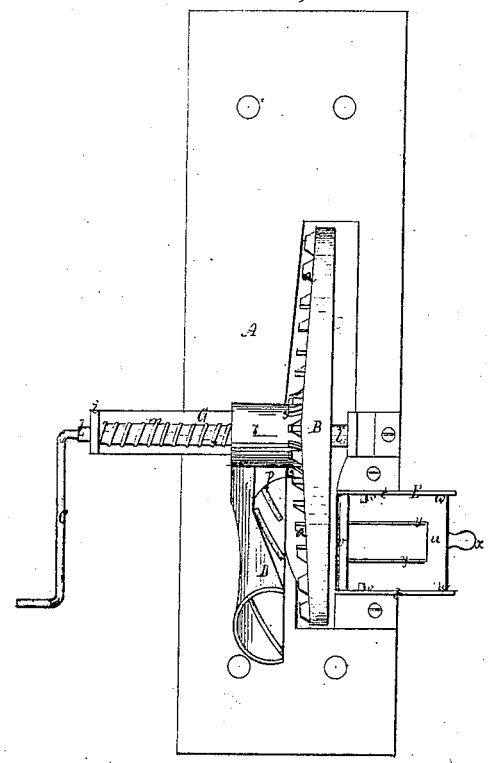
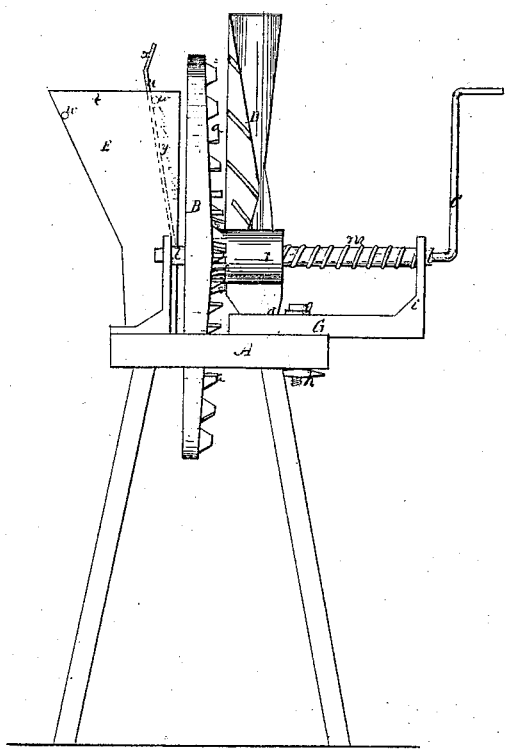
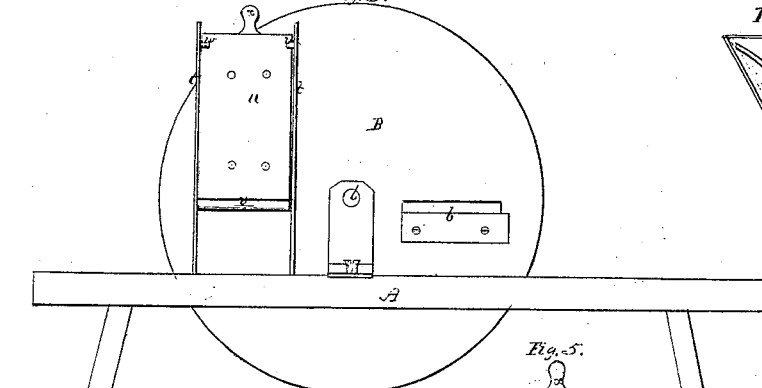

United States Patent Office.

JEREMIAH P. SMITH, OF HUMMELSTOWN, PENNSYLVANIA.

Letters Patent No. 102,607, dated May 3, 1870.

IMPROVEMENT IN COMBINED CORN-SHELLER AND VEGETABLE-SLICER.

The Schedule referred to in these Letters Patent and making part of the same

*To all whom it may concern:*

Be it known that I, JEREMIAH P. SMITH, of Hummelstown, in the county of Dauphin and State of Pennsylvania, have invented a Combined Corn-Sheller, and Vegetable and Meat-Slicer or Cutter; and I do hereby declare that the following is a full and exact description thereof, reference being had to the accompanying drawings making part of this specification, Figure 1 being a top view of the machine.
Figure 2, a front-end view of the same.
Figure 3, a left-side view thereof.
Figures 4, 5, and 6, views of parts detached.

Like letters designate corresponding parts in all the figures.

Upon a suitable bench or frame, A, is mounted a revolving disk, B, turned by a crank, C, or other means, according to the power employed. This disk B serves both for a shelling and a cutter-wheel.

For shelling, it has shelling-teeth $a$ $a$ on one face, to operate in connection with a concave D, which holds the ears of corn, and, for slicing or cutting vegetables or meat, it has one or more cutters $b$ on the opposite face, operating in connection with a hopper or holder, E.

The shelling-concave D is mounted on the disk-shaft $l$, and a slotted cross-bar, G, being secured therein by a projection, $d$, (fig. 4,) which fits in a longitudinal slot, $f$, (fig. 6,) or groove, in the said cross-bar.

The cross-bar is fastened to the bench A by means of a bolt, $g$, extending down through the slot $f$, and through the bench, under which it is secured by a thumb-nut, $h$. It serves not only to hold the shelling-concave, but also sustains one bearing $i$ of the disk-shaft $l$, and holds one end of the spring $m$, which presses the sliding concave to the shelling-disk.

This slotted cross-bar, and the mounting of the shelling-concave in its slot, have special reference to the use of the machine for cutting and slicing.

When the machine is to be used as a cutter, the sheller-concave D is to be removed from close proximity to the disk B, in order to allow the discharge of the material, as it is cut and passed through the disk. To effect this removal of the concave, the screw-bolt $g$ is loosened, to allow the cross-bar G to be drawn outward, and let the concave fall back upon the bench, out of the way. For shelling, the concave is easily replaced.

Or, instead of moving away the concave, the cutter-hopper E may be placed at the other side of the disk-shaft $l$, and the disk be turned, and its knives $b$ cut the other way. Thus the hopper would not be opposite to the concave, and the sheller would not interfere with the cutter in the same machine.

The concave D has a set of teeth $p$ $p$, (fig. 4,) at its lower end, extending concentrically part of the way round its bearing $r$, on the shaft $l$, which teeth act in connection with the teeth $s$ $s$, near the center of the disk B.

Each set of teeth $p$ $p$ and $s$ $s$, embraces about one-half of the diameter of the ears of corn, and, one set being stationary while the other set revolves, the ears are held from passing down too fast, while they are effectually shelled.

The hopper or holder E, on the opposite side of the disk B, and used in connection with the knife or knives, (from one to four of the knives being used in the disk,) is composed of two stationary sides $t$ $t$, and a movable back, $u$, for pressing the cabbage, meat, or other substance, to the disk.

This movable back is pivoted at the bottom of the hopper, where it has an enlarged, round bearing, $v$, around its pivot, extending nearly in to the disk, and thus preventing the dropping through of any of the substance to be cut, being always at a fixed distance from the disk, while the upper end of the movable back moves out and in.

The movable back is limited in its movement, both inward, so as to prevent its coming in contact with the disk-cutter or cutters, and outward, so as not to fall back too far, by means of stops $w$ $w$, projecting from the sides $t$ $t$ of the hopper, as represented.

It is moved by a suitable handle, $x$, which is grasped by the hand of the operator.

It has a series of teeth, $y$ $y$, on the edge of a plate or plates, attached to its inner surface, the teeth being somewhat like saw-teeth, and sloping downward so as to hold the articles down in the hopper.

The use and operation of the entire machine are obvious.

What I claim as my invention and desire to secure by Letters Patent is—

The combination of the shelling and cutting-disk B, with the concave D, and hopper E, substantially as and for the purposes herein specified.

Also, the arrangement of the concave D, constructed with the teeth $p$ $p$, and projection $d$, in combination with the movable slotted cross-bar G, substantially as and for the purpose herein specified.

Also, the construction of the hopper E, with its movable back $u$, enlarged bearing $v$, and stops $w$ $w$, arranged in combination with the cutting and shelling-wheel B, substantially as and for the purpose herein set forth.

Also, the teeth $y$ $y$, on the inner surface of the movable hopper-back, for the purpose herein specified.

This specification signed by me December 4, 1869.

J. P. SMITH.

Witnesses:
MICHAEL BAUM,
FRANKLIN Z. STECHER.